United States Patent
Gerbig

(10) Patent No.: US 10,100,784 B2
(45) Date of Patent: Oct. 16, 2018

(54) SUPERCHARGED INTERNAL COMBUSTION ENGINE

(71) Applicant: Bayerische Motoren Werke Aktiengesellschaft, Munich (DE)

(72) Inventor: Falk Gerbig, Allershausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/358,271

(22) Filed: Nov. 22, 2016

(65) Prior Publication Data

US 2017/0096969 A1  Apr. 6, 2017

Related U.S. Application Data

(63) Continuation of application No. PCT/EP2015/059671, filed on May 4, 2015.

(30) Foreign Application Priority Data

Jun. 3, 2014 (DE) .................. 10 2014 210 508

(51) Int. Cl.
- *F02M 25/08* (2006.01)
- *B01D 53/04* (2006.01)
- *F02B 37/16* (2006.01)

(52) U.S. Cl.
CPC ....... *F02M 25/089* (2013.01); *B01D 53/0407* (2013.01); *F02B 37/16* (2013.01);
(Continued)

(58) Field of Classification Search
CPC .. F02M 25/089; F02M 25/0836; F02M 25/08; B01D 53/0407; B01D 2253/102;
(Continued)

(56) References Cited

U.S. PATENT DOCUMENTS

| 5,269,278 A | 12/1993 | Heinemann et al. |
| 5,979,418 A * | 11/1999 | Saruwatari ............ F02B 37/16 123/383 |

(Continued)

FOREIGN PATENT DOCUMENTS

| CN | 202403915 U | 8/2012 |
| CN | 204239013 U | 4/2015 |

(Continued)

OTHER PUBLICATIONS

International Search Report (PCT/ISA/210) issued in PCT Application No. PCT/EP2015/059671 dated Jul. 6, 2015 with English translation (Four (4) pages).

(Continued)

*Primary Examiner* — Thomas Moulis
*Assistant Examiner* — John Bailey
(74) *Attorney, Agent, or Firm* — Crowell & Moring LLP

(57) ABSTRACT

A supercharged internal combustion engine includes an intake tract and a throttle element. Between the compressor and the throttle element, the intake tract is gas-conductively connected on the low-pressure side to a first line and on the high-pressure side to a second line via an overrun air recirculation valve. A fuel tank having an activated carbon filter is provided for supplying fuel to the internal combustion engine, the fuel tank being gas-conductively connected via a valve to a tank venting valve. Between the compressor and the throttle element, the intake tract is gas-conductively connected on the low-pressure side to a third line and on the high-pressure side to a fourth line via the tank venting valve. The overrun air recirculation valve and the tank venting valve are arranged in parallel in terms of flow and the first and third lines and the second and fourth lines are, at least in sections, the same lines.

5 Claims, 1 Drawing Sheet

(52) U.S. Cl.
CPC ... *F02M 25/0836* (2013.01); *B01D 2253/102* (2013.01); *B01D 2257/702* (2013.01); *B01D 2259/4516* (2013.01)

(58) Field of Classification Search
CPC ...... B01D 2257/702; B01D 2259/4516; F02B 37/16; B60K 15/035
USPC ............... 123/516, 519, 520, 521, 698, 518; 60/600, 601, 606, 610, 611, 612, 619; 137/493, 493.9, 495, 583, 587, 589
See application file for complete search history.

(56) References Cited

U.S. PATENT DOCUMENTS

| | | | | |
|---|---|---|---|---|
| 2004/0237946 | A1* | 12/2004 | Murakami | F02M 25/08 123/520 |
| 2010/0300413 | A1 | 12/2010 | Ulrey et al. | |
| 2013/0008413 | A1* | 1/2013 | Inoguchi | F02M 25/0836 123/518 |
| 2013/0199504 | A1* | 8/2013 | Takeishi | F02M 25/0809 123/520 |
| 2013/0220282 | A1* | 8/2013 | Hadre | F02M 25/0809 123/520 |
| 2014/0116399 | A1* | 5/2014 | Ulrey | F02M 25/08 123/520 |
| 2014/0251284 | A1* | 9/2014 | Plymale | F02M 25/089 123/518 |
| 2014/0251285 | A1* | 9/2014 | Surnilla | F02B 47/08 123/520 |
| 2014/0318514 | A1* | 10/2014 | Pursifull | F01M 13/022 123/568.29 |
| 2015/0292421 | A1* | 10/2015 | Pursifull | F02D 41/004 123/518 |
| 2015/0308310 | A1* | 10/2015 | Pursifull | F02B 37/127 123/403 |
| 2016/0273493 | A1* | 9/2016 | Ono | F02M 25/0836 |

FOREIGN PATENT DOCUMENTS

| | | |
|---|---|---|
| DE | 41 39 946 C1 | 2/1993 |
| DE | 198 57 924 A1 | 6/1999 |
| DE | 10 2010 029 150 A1 | 12/2010 |
| DE | 10 2011 084 539 B3 | 12/2012 |
| DE | 10 2013 221 310 A1 | 4/2014 |

OTHER PUBLICATIONS

German-language Written Opinion (PCT/ISA/237) issued in PCT Application No. PCT/EP2015/059671 dated Jul. 6, 2015 (Four (4) pages).

German-language Search Report issued in counterpart German Application No. 10 2014 210 508.0 dated Oct. 28, 2014 with partial English translation (Eleven (11) pages).

Chinese-language Office Action issued in counterpart Chinese Application No. 201580009913.2 dated Feb. 9, 2018 with English translation (Eleven (11) pages).

* cited by examiner

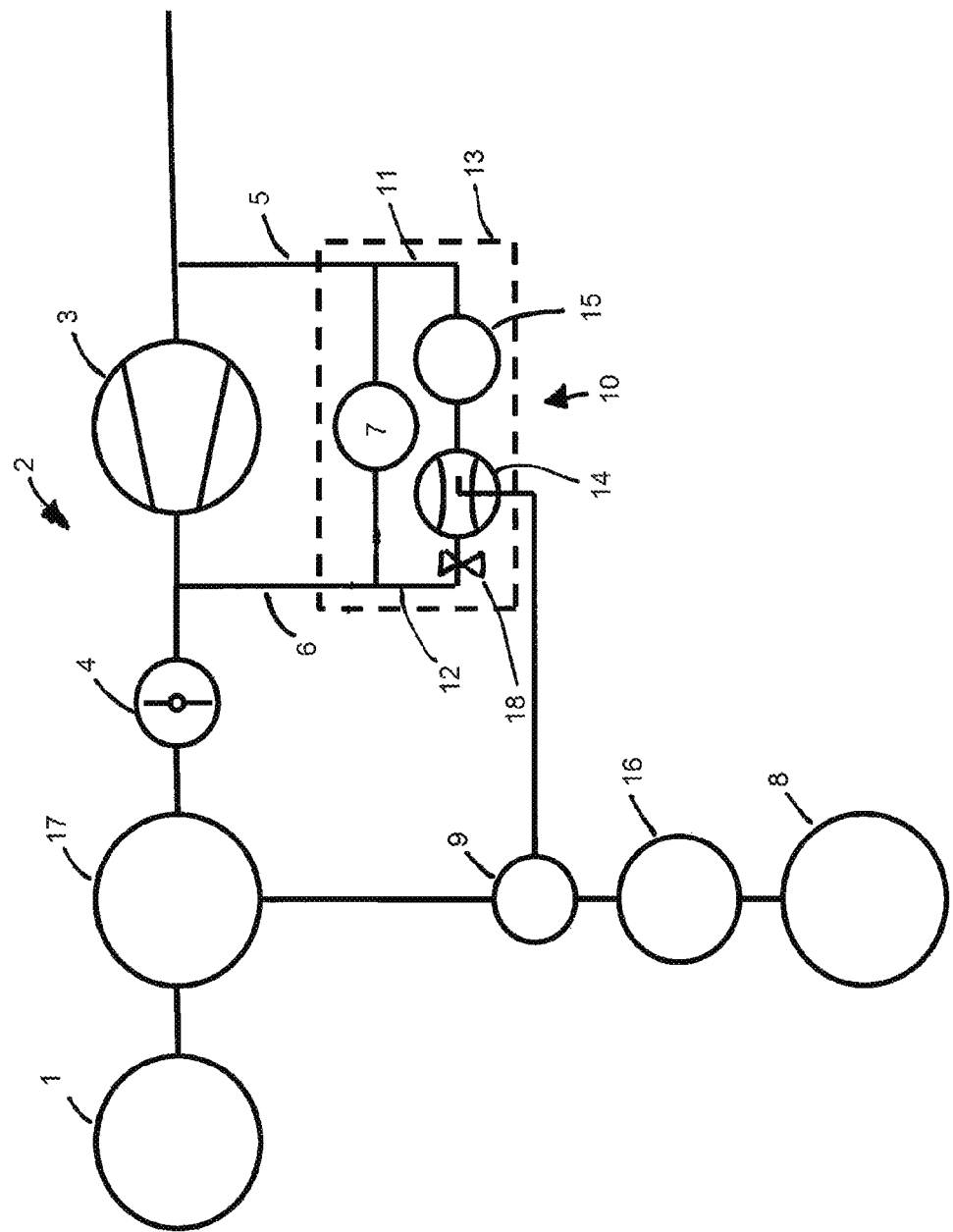

SUPERCHARGED INTERNAL COMBUSTION ENGINE

CROSS REFERENCE TO RELATED APPLICATIONS

This application is a continuation of PCT International Application No. PCT/EP2015/059671, filed May 4, 2015, which claims priority under 35 U.S.C. § 119 from German Patent Application No. 10 2014 210 508.0, filed Jun. 3, 2014, the entire disclosures of which are herein expressly incorporated by reference.

BACKGROUND AND SUMMARY OF THE INVENTION

Modern motor vehicles have an internal combustion engine which is operated with a fuel (e.g. gasoline or diesel) stored in a tank. Owing to the temperatures and pressures prevailing in the tank, gases are formed by evaporation, and these must not be released into the environment of the vehicle or may be released to only a limited extent. On the one hand, there are legal limits for evaporative emissions, and these are determined in defined cycles, and, on the other hand, discharged gas containing hydrocarbons (HC) leads to a perceptible fuel odor. This odor is perceived to be troublesome by customers and thus leads to customer complaints. Moreover, a fire hazard can also arise from escaping gas or liquid fuel in extreme cases.

To avoid releasing the hydrocarbon-enriched gas formed into the environment, it is stored temporarily in an activated carbon filter. To avoid overflow from the activated carbon filter, the filter must be purged as often as possible during operation. At the same time, the purging rate must be higher on average than the volume of gas formed in the tank. The activated carbon filter is purged by feeding the tank venting gas into the air supply to the internal combustion engine. The fuel present in this gas is allowed for in the pilot control of the mixture by the control unit of the internal combustion engine, ensuring that the fuel gases formed in the tank are burnt with neutral effects on combustion and emissions. To produce purging of the activated carbon filter, a purging gradient (pressure gradient) must be achieved. This necessary purging gradient is produced by a vacuum in the air supply to the internal combustion engine relative to the ambient pressure of the vehicle by means of a throttle element, e.g. a throttle valve. Control of venting is accomplished by means of a valve, which is usually controlled electrically.

In the case of supercharged internal combustion engines, e.g. those having a turbocharger or a supercharger, there is an excess pressure in the intake system in the upper load range of the internal combustion engine, i.e. at full load or in upper partial load ranges, with the result that it is not possible to achieve purging of the activated carbon filter at these operating points. In order to be able to perform purging of the activated carbon filter in the supercharged mode of the internal combustion engine, the proposal in the prior art is to arrange the point of introduction of the tank venting gas ahead of the compressor of the turbocharger. If there is an insufficient vacuum in the intake line ahead of the compressor, tank venting can be improved by means of a Venturi nozzle. For this purpose, an ejector jet path is installed, starting from the high-pressure side and leading to the low-pressure side of the compressor. A passive ejector pump (Venturi nozzle) is integrated into this ejector jet path and produces the required vacuum for the tank venting system in the supercharged mode of the internal combustion engine.

However, supercharged internal combustion engines have the disadvantage that when there is a rapid reduction in load, there can be "pumping" of the compressor. This state arises when, in the event of a reduction in load, the throttle valve is rapidly closed and the air column builds up as far as the compressor counter to the direction of flow of the air path. As a result, there is a pressure increase in the region of the intake tract between the compressor and the inlet valves of the internal combustion engine and consequently a flow separation in the compressor, which has a negative acoustic effect.

To avoid compressor pumping and component damage resulting therefrom, overrun air recirculation valves are used in the prior art. These are integrated into the region of the intake tract between the compressor and the throttle valve of the internal combustion engine in order to rapidly dissipate the existing excess pressure in the high-pressure section of the intake tract in the direction of the low-pressure side of the intake tract when there is a reduction in load, i.e. the high-pressure side of the compressor is connected gas-conductively to the low-pressure side of the compressor.

The use of overrun air recirculation valves entails additional hardware, which generates additional expenditure in the development and assembly of internal combustion engines. Moreover, there is the risk with all the additional components that they will fail in operation and consequently may cause loss of comfort or consequent damage to other components.

To circumvent this disadvantage, German Patent DE 10 2011 084 539 B3 proposes a turbocharger having a compressor, the housing of which contains a low-pressure inlet region connected to a low-pressure inlet and a high-pressure outlet region connected to a high-pressure outlet. The low-pressure inlet region is connected to the low-pressure side of an intake pipe and the high-pressure outlet region is connected to the high-pressure side of the intake pipe. The compressor has a Venturi nozzle, which is arranged between the high-pressure outlet region and the low-pressure inlet region and is furthermore connected to an activated carbon filter to allow venting of the latter. The compressor furthermore has an overrun air recirculation valve, to which the Venturi nozzle is connected, and venting of the activated carbon filter takes place when the overrun air recirculation valve is opened.

However, the disadvantage with this known embodiment is that tank venting requires a significantly smaller flow cross section than an overrun air recirculation valve.

It is an object of the embodiments of the present invention to indicate a measure with which the abovementioned disadvantages can be avoided while simultaneously reducing the components used.

This object is achieved by the features in the characterizing part of patent claim 1.

Combining two functions in a valve combination eliminates the duplicated gas supply and gas discharge lines to and from the valves, the second control cable for the valves and a second component holder for a second housing. Advantages thus arise in terms of costs, installation space and weight without functional disadvantages.

Thus, according to patent claim 2, the overrun air recirculation valve and the tank venting valve are preferably arranged in a common housing in order to save installation space.

According to patent claim 3, the tank venting valve may include a robust Venturi nozzle and a likewise known flow widening valve having at least two flow cross section widening stages.

In another preferred embodiment, according to patent claim 4, the fuel tank can have a gas connection to the intake tract by means of the valve, thereby allowing purging of the activated filter when the internal combustion engine is operated in the unsupercharged mode (naturally aspirated mode).

According to patent claim 5, a first throttle element, by means of which the tank venting valve can be shut off in order to minimize leakage losses and thus power losses of the internal combustion engine, is preferably provided in the first or second line.

The embodiments of the invention are explained in greater detail below by means of a schematically illustrated embodiment example in a single FIGURE.

Other objects, advantages and novel features of the embodiments of the present invention will become apparent from the following detailed description of one or more preferred embodiments when considered in conjunction with the accompanying drawing.

BRIEF DESCRIPTION OF THE DRAWING

FIG. 1 is a schematical depiction of an internal combustion engine according to an embodiment of the invention.

DETAILED DESCRIPTION OF THE DRAWING

FIG. 1 shows a supercharged internal combustion engine 1 according to the embodiments of the invention having an intake tract 2, in which a compressor 3, e.g. a compressor of an exhaust turbocharger or a supercharger, is arranged. Also arranged in the intake tract 2, between the compressor 3 and the internal combustion engine 1, is a throttle element 4, e.g. a throttle valve. Between the compressor 3 and the throttle element 4, the intake tract 2 can be gas-conductively connected on the low-pressure side to a first line 5 and on the high-pressure side to a second line 6 by means of an overrun air recirculation valve 7, wherein it should also be possible to fully close the overrun air recirculation valve 7.

To supply fuel to the internal combustion engine 1, a fuel tank 8 is furthermore provided, having an activated carbon filter 16, which can be gas-conductively connected to a tank venting valve 10 by means of a valve 9. Between the compressor 3 and the throttle element 4, the intake tract 2 can furthermore be gas-conductively connected on the low-pressure side to a third line 11 and on the high-pressure side to a fourth line 12 by means of the tank venting valve 10.

According to the embodiments of the invention, the overrun air recirculation valve 7 and the tank venting valve 10 are arranged in parallel in terms of flow, and the first line 5 and the third line 11 and the second line 6 and the fourth line 12 are, at least in sections, the same lines.

The overrun air recirculation valve 7 and the tank venting valve 10 are furthermore arranged in a common housing 13 in order to save installation space.

For a particularly robust embodiment, the tank venting valve 10 includes a Venturi nozzle 14 and a flow widening valve 15.

In a further advantageous embodiment, the fuel tank 8 and the activated carbon filter 16 in the embodiment example in FIG. 1 can be gas-conductively connected to the intake tract 2 by means of the valve 9. It is thus possible to draw the hydrocarbon vapors out of the activated carbon filter 16 by means of the vacuum prevailing in the intake tract in the unsupercharged mode of the internal combustion engine and feed them to combustion.

As an option, a first throttle element 18, by means of which the tank venting valve 10 can be shut off, is provided in the first line 5. As an alternative, the throttle element 18 can also be arranged in the second line 6, as illustrated in FIG. 1. By means of this embodiment, hydrocarbon vapors are drawn out of the activated filter 16 only when required.

The combination according to the embodiments of the invention of two functions in a valve combination (overrun air recirculation valve 7 in parallel with the tank venting valve 10 in a single housing 13) eliminates the duplicated gas supply and gas discharge lines 5, 6, 11, 12 to and from the valves 7, 10, the second control cable for the valves 7, 10 and a second component holder for a second housing. Advantages thus arise in terms of costs, installation space and weight without functional disadvantages.

LIST OF REFERENCE SIGNS 1. internal combustion engine
2. intake tract
3. compressor
4. throttle element
5. first line
6. second line
7. overrun air recirculation valve
8. fuel tank
9. valve
10. tank venting valve
11. third line
12. fourth line
13. housing
14. Venturi nozzle
15. flow widening valve
16. activated carbon filter
17. manifold
18. first throttle element The foregoing disclosure has been set forth merely to illustrate the embodiments of the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A supercharged internal combustion engine comprising:
   an intake tract in which a compressor is arranged; and
   a throttle element that is arranged in the intake tract between the compressor and the internal combustion engine, wherein
      between the compressor and the throttle element, the intake tract is gas-conductively connected on the low-pressure side to a first line and on the high-pressure side to a second line via an overrun air recirculation valve,
      a fuel tank having an activated carbon filter is provided for supplying fuel to the internal combustion engine, the fuel tank being gas-conductively connected via a valve to a tank venting valve,
      between the compressor and the throttle element, the intake tract is gas-conductively connected on the low-pressure side to a third line and on the high-pressure side to a fourth line via the tank venting valve, and the overrun air recirculation valve and the tank venting valve are arranged in parallel in terms of flow and the first and third lines and the second and fourth lines are, at least in sections, the same lines, wherein the throttle element is disposed in the fourth line.

2. The supercharged internal combustion engine as claimed in claim 1, wherein the overrun air recirculation valve and the tank venting valve are arranged in a common housing, and the tank venting valve comprises a Venturi nozzle and a flow widening valve.

3. The supercharged internal combustion engine as claimed in claim 2, wherein the activated carbon filter is gas-conductively connected to the intake tract via the valve.

4. The supercharged internal combustion engine as claimed in claim 3, wherein a first throttle element, via which the tank venting valve is shut off, is provided in the first or second line.

5. The supercharged internal combustion engine as claimed in claim 1, wherein the tank venting valve comprises a Venturi nozzle and a flow widening valve.

* * * * *